(12) United States Patent
Ito

(10) Patent No.: US 9,544,211 B2
(45) Date of Patent: Jan. 10, 2017

(54) MEASURING APPARATUS AND METHOD

(71) Applicant: KABUSHIKI KAISHA TOSHIBA, Minato-ku, Tokyo (JP)

(72) Inventor: Masashi Ito, Yokohama Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 32 days.

(21) Appl. No.: 14/462,971

(22) Filed: Aug. 19, 2014

(65) Prior Publication Data

US 2015/0049627 A1 Feb. 19, 2015

(30) Foreign Application Priority Data

Aug. 19, 2013 (JP) ................................ 2013-169710

(51) Int. Cl.
*H04L 12/26* (2006.01)

(52) U.S. Cl.
CPC ......... *H04L 43/0864* (2013.01); *H04L 43/106* (2013.01)

(58) Field of Classification Search
CPC ...... H04L 43/0864; H04L 43/106; H04L 7/00; H04L 7/016; H04L 7/0033; H04L 7/0073; H04L 43/0852; H04L 43/858
USPC ................ 370/252, 350, 503, 509, 512, 519
See application file for complete search history.

(56) References Cited

U.S. PATENT DOCUMENTS

| | | | | |
|---|---|---|---|---|
| 6,052,726 A * | 4/2000 | Fontenot | ............. | H04L 43/0864 370/252 |
| 7,577,169 B1 * | 8/2009 | Dinh | ..................... | H04J 3/0667 370/350 |
| 7,835,280 B2 * | 11/2010 | Pang | .................... | G06F 15/7842 370/230.1 |
| 2003/0002539 A1 * | 1/2003 | Soda | ..................... | H04J 3/0685 370/509 |
| 2005/0281247 A1 * | 12/2005 | Lim | ...................... | H04J 3/0647 370/350 |
| 2007/0116064 A1 * | 5/2007 | Kim | ...................... | H04J 3/0682 370/508 |
| 2008/0031283 A1 * | 2/2008 | Curran-Gray | ......... | H04J 3/0667 370/503 |
| 2010/0085989 A1 * | 4/2010 | Belhadj | ................ | H04J 3/0667 370/503 |
| 2010/0135332 A1 * | 6/2010 | Siemens | ............... | H04J 3/0667 370/503 |

(Continued)

FOREIGN PATENT DOCUMENTS

JP 2001-202156 A 7/2001

*Primary Examiner* — Mark Rinehart
*Assistant Examiner* — Kenneth P Hunt
(74) *Attorney, Agent, or Firm* — Ohlandt, Greeley, Ruggiero & Perle, L.L.P.

(57) ABSTRACT

According to one embodiment, a measuring apparatus includes a first calculation unit and a second calculation unit. The first calculation unit calculates, as a communication delay for each request packet, a half of a round trip time based on first time information included in the request packet and second time information included in a response packet, the request packet requesting a notification of a reference time, the response packet being a response to the request packet. The second calculation unit calculates one of one or more communication delays not more than a threshold among a plurality of communication delays as an estimated delay of each response packet to be transmitted from the one or more second devices.

10 Claims, 5 Drawing Sheets

(56) References Cited

U.S. PATENT DOCUMENTS

| | | | |
|---|---|---|---|
| 2011/0161524 A1* | 6/2011 | Na | H04W 56/0015 709/248 |
| 2013/0191486 A1* | 7/2013 | Someya | H04L 41/04 709/208 |
| 2014/0071344 A1* | 3/2014 | Francisco | H04N 21/242 348/500 |
| 2014/0269673 A1* | 9/2014 | Yin | H04J 3/0667 370/350 |
| 2014/0348181 A1* | 11/2014 | Chandra | H04J 3/0667 370/503 |

* cited by examiner

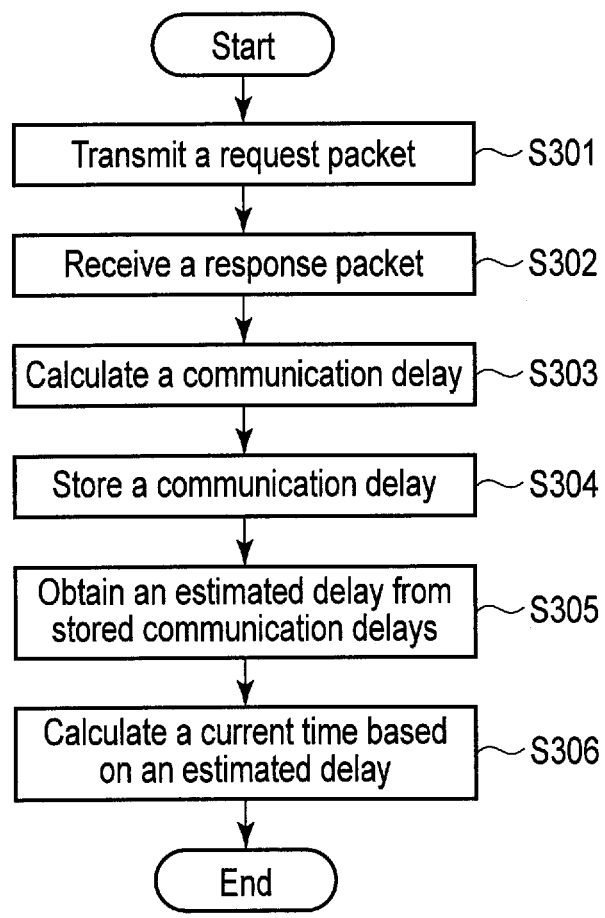
F I G. 3

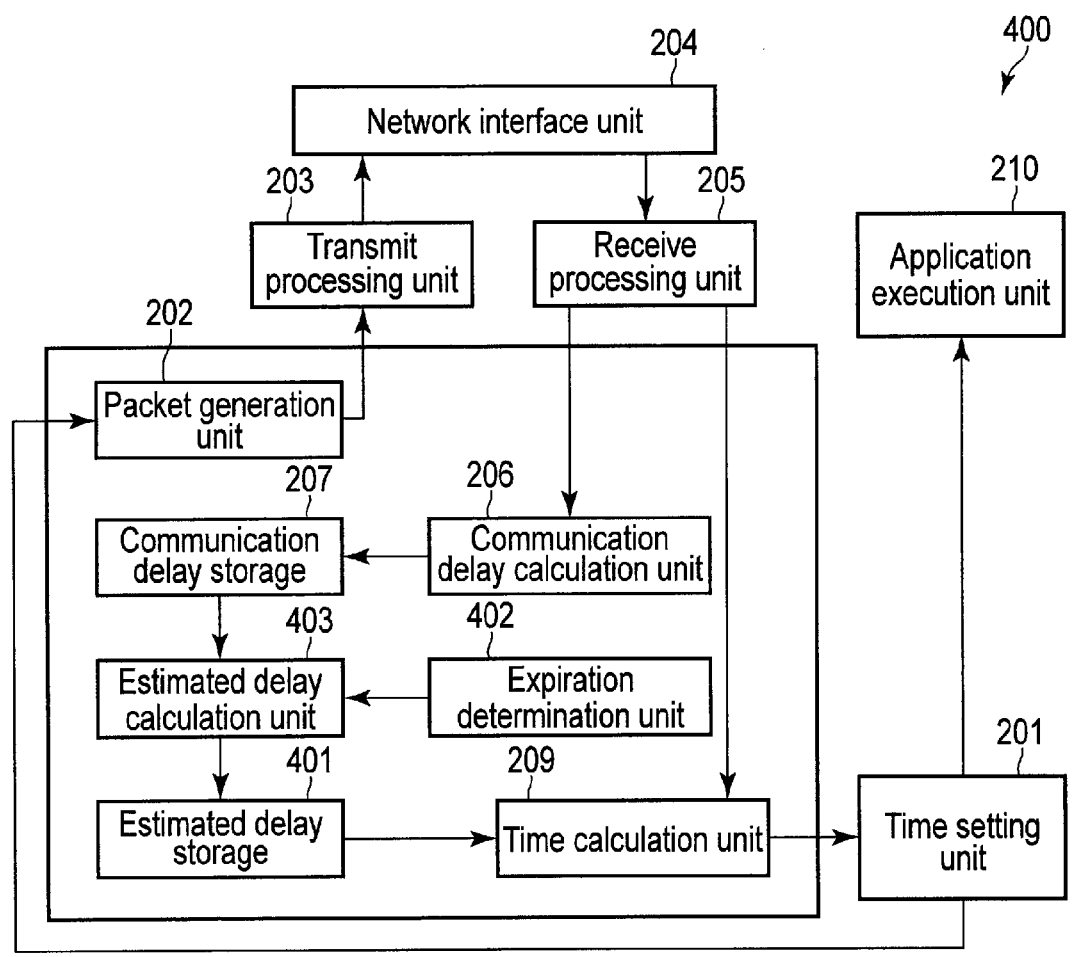
F I G. 4

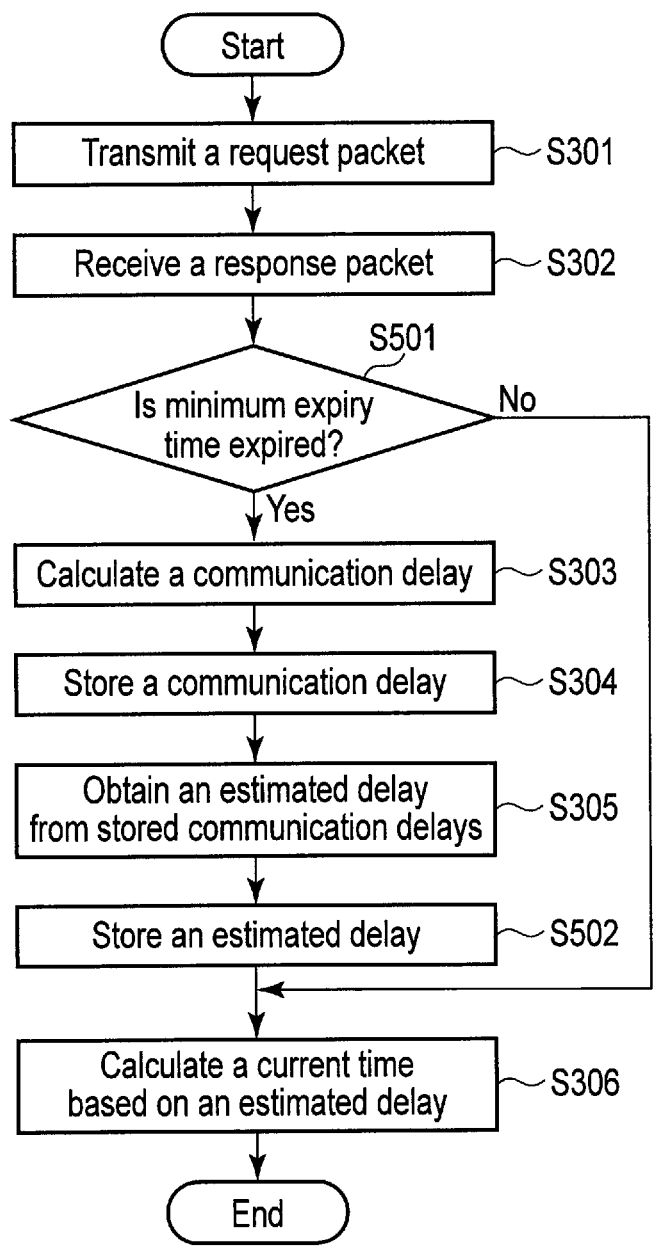
F I G. 5

MEASURING APPARATUS AND METHOD

CROSS-REFERENCE TO RELATED APPLICATIONS

This application is based upon and claims the benefit of priority from Japanese Patent Application No. 2013-169710, filed Aug. 19, 2013, the entire contents of which are incorporated herein by reference.

FIELD

Embodiments described herein relate generally to a measuring apparatus and method.

BACKGROUND

At an electric power substation, for example, there is a technique for detecting malfunctions by comparing an electrical current value and a voltage value transmitted alternately from a protection relay. To perform the comparison accurately, accurate time synchronization is required.

As a conventional time synchronization technique, there is a time synchronization technique wherein an existing communication delay and an immediately previous communication delay are compared, and if an immediately previous inter-network communication delay is small, time synchronization is performed using time information when a communication delay is small.

BRIEF DESCRIPTION OF THE DRAWINGS

FIG. 3 is a flowchart showing the operation of the measuring apparatus according to the first embodiment.
FIG. 4 is a block diagram of the measuring apparatus according to the second embodiment.
FIG. 5 is a flowchart showing the measuring apparatus according to the second embodiment.

DETAILED DESCRIPTION

Figure 1:
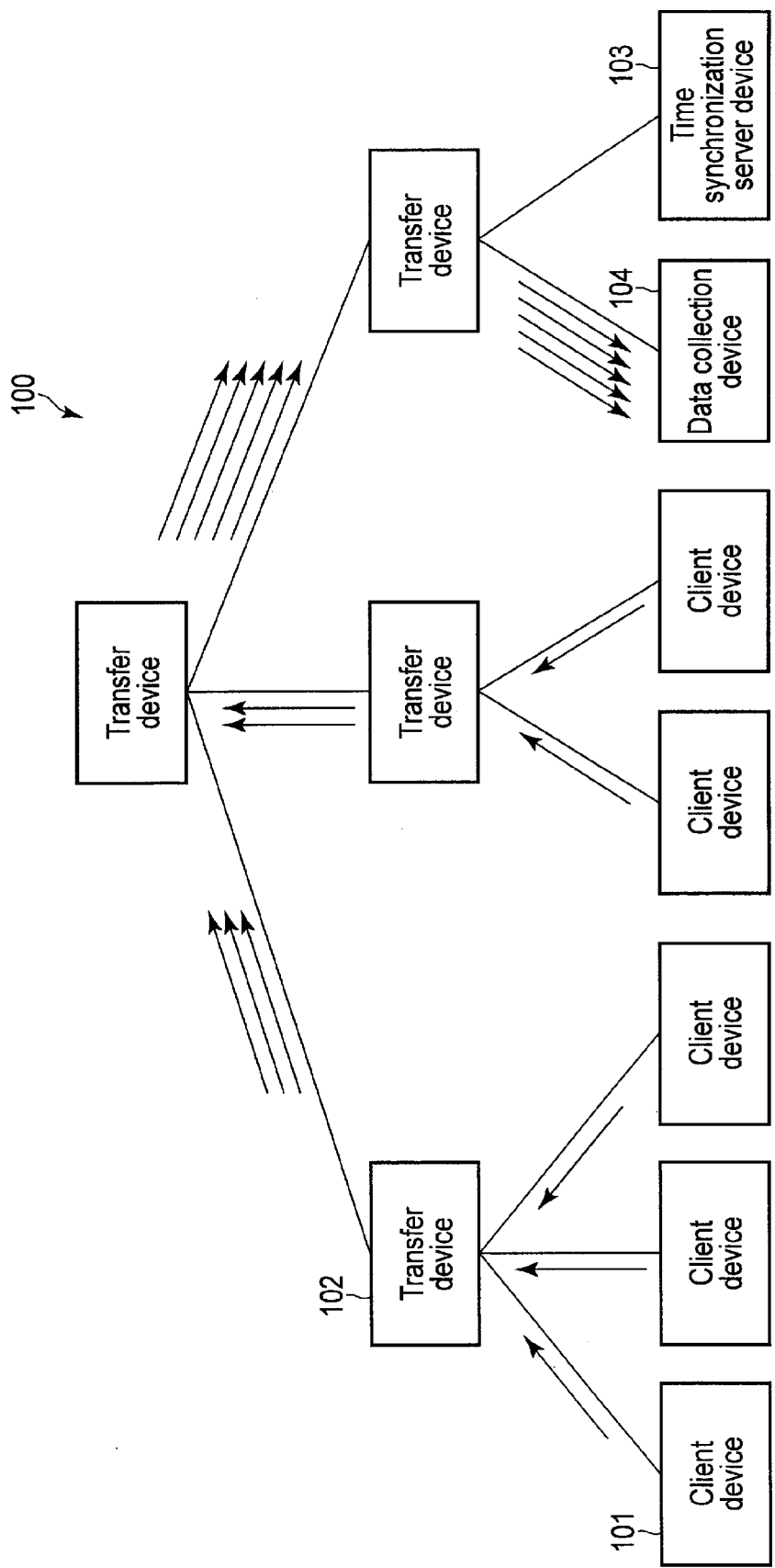
FIG. 1 is a conceptual diagram of an example of use of a time synchronization system.

The problem in the aforementioned technique is that the more uneven the communication delays are, the more the accuracy of time synchronization is degraded.

In general, according to one embodiment, a measuring apparatus is used in an asymmetrical network in which a first traffic in a network from a plurality of first devices to one or more second devices larger than a second traffic in the network from the one or more second devices to the plurality of first devices, the one or more second devices being less than the first devices. The apparatus includes a first calculation unit and a second calculation unit. The first calculation unit is configured to calculate, as a communication delay for each request packet, a half of a round trip time based on first time information included in the request packet and second time information included in a response packet, the request packet requesting a notification of a reference time and including the first time information, the response packet being a response to the request packet and including the second time information. The second calculation unit is configured to calculate one of one or more communication delays not more than a threshold among a plurality of communication delays as an estimated delay of each response packet to be transmitted from the one or more second devices.

In the following, the measuring apparatus and method according to an embodiment of the present disclosure will be explained with reference to the drawings. In the following embodiments, the explanation of the elements with the same reference numerals will be omitted for brevity as their operations will be the same.

First Embodiment

An example of use of a time synchronization system including a measuring apparatus according to the present embodiment will be explained with reference to FIG. 1. Herein, malfunction detection between substations in a factory network in which a central server collects data will be explained as an example; however, the time synchronization system according to the present embodiment can be applicable to any system requiring time synchronization.

The time synchronization system 100 shown in FIG. 1 includes a client device 101, a transfer device 102, a time synchronization server device 103, and a data collection device 104.

In FIG. 1, the arrows represent the directions and amounts of main traffic. As shown in FIG. 1, the paths from a plurality of client devices 101 to the time synchronization server device 103 illustrate a high volume of traffic data; in other words, there is wide variation in the range of communication delays. On the other hand, the paths from the time synchronization server devices 103 to a plurality of the client devices 101 have a low volume of traffic data; in other words, the variation in the range of communication delays is small. Thus, the present embodiment is premised on an asymmetrical network in which the volume of traffic data from a plurality of client devices 101 to a time synchronization server device 103 is high, and the volume of traffic data from a time synchronization server device 103 to a plurality of client devices 101 is low.

The client device 101 includes a measuring apparatus, and transmits information related to an electrical current value and a voltage value to the data collection device 104 via the transfer device 102. When time synchronization is performed, the client device 101 transmits a request packet which requests a reference time to the time synchronization server device 103 via the transfer device 102. Then, the client device 101 receives a response packet including information related to a reference time in response to the request packet from the time synchronization server device 103, and corrects the current time.

The transfer device 102 is a normal relay device, and it transfers packets from the client device 101 or the time synchronization server device 103 to a destination.

The time synchronization device 103 has a reference time, and transmits a response packet in response to a request packet from the client device 101 to the client device 101.

The data collection device 104 collects information related to an electrical current value and a voltage value from a plurality of the client devices 101, and stores the collected information.

Figure 2:
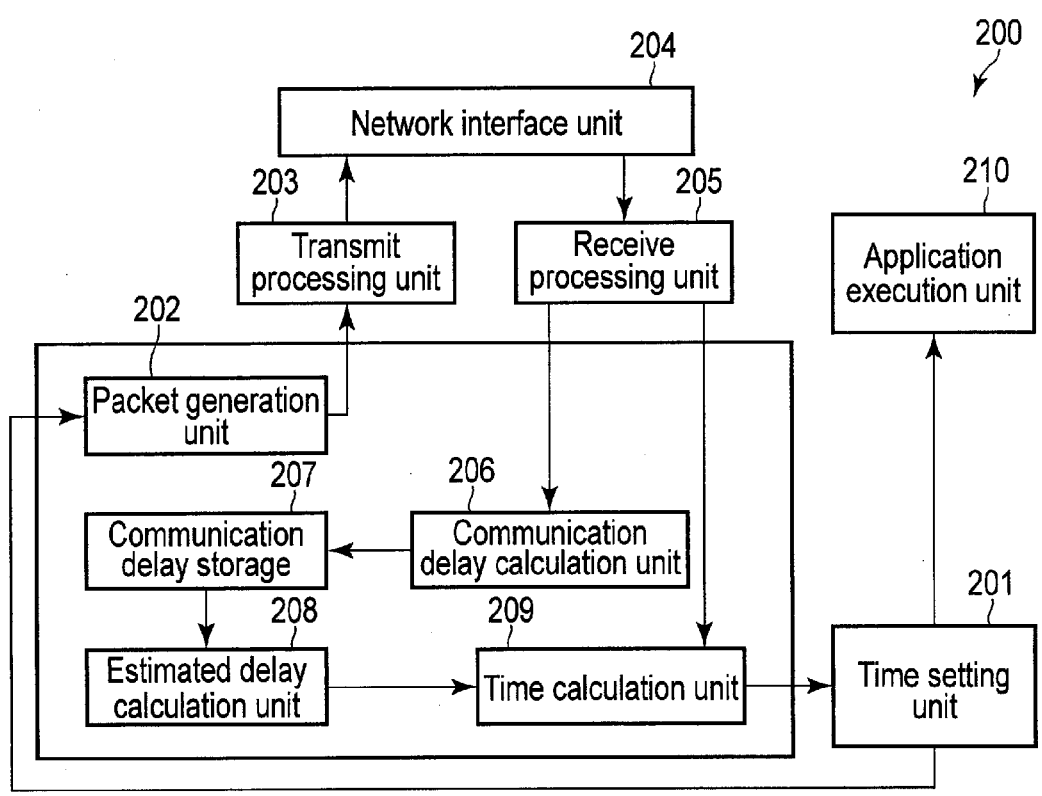
FIG. 2 is a block diagram of the measuring apparatus according to the first embodiment.

A measuring apparatus included in the client device 101 according to the first embodiment is explained with reference to the block diagram of FIG. 2.

The measuring apparatus 200 according to the first embodiment includes a time setting unit 201, a packet generation unit 202, a transmit processing unit 203, a network interface unit 204, a receive processing unit 205, a communication delay calculation unit 206, a communication delay storage 207, an estimated delay calculation unit 208, a time calculation unit 209, and an application execution unit 210.

The time setting unit 201 extracts information related to a current time at the measuring apparatus 200 when generating a request packet. If the time setting unit 201 receives information related to a corrected time from the time calculation unit 209 (described later), it corrects the current time using the corrected time.

The packet generation unit 202 receives information related to a current time from the time setting unit 201, and generates a request packet.

The transmit processing unit 203 receives the request packet from the packet generation unit 202, and executes signal processing (digital-analog conversion, modulation processing, etc.) to transmit the request packet to an external device. Then, the transmit processing unit 203 transmits the request packet to the external device via the network interface unit 204. When transmitting the request packet, a time of the transmission is included as time information.

The network interface unit 204 receives a request packet from the transmit processing unit 203, and transmits the request packet to the time synchronization server device 103. The network interface unit 204 further receives a response packet from the time synchronization server device 103. The network interface unit 204 may be a general network interface that transmits packets to and receives packets from the external device.

The receive processing unit 205 receives the response packet via the network interface unit 204, and executes signal processing (analog-digital conversion, demodulation, etc.) on the response packet. The response packet includes the time when the request packet is received at the time synchronization server device 103, and the time when the response packet is transmitted.

The communication delay calculation unit 206 receives the response packet from the receive processing unit 205, and calculates a round trip time (RTT) based on the time information of the request packet and the response packet, and a half of the RTT is calculated as the communication delay.

The communication delay storage 207 receives the communication delay from the communication delay calculation unit 206, and stores the communication delay. The communication delay storage 207 accumulates communication delays along with past communication delays calculated at the communication delay calculation unit 206, and stores the communication delays.

The estimated delay calculation unit 208 refers to the past communication delays stored in the communication delay storage 207, and obtains one or more of the communication delays which are smaller than a threshold as estimated delays of the response packet to be transmitted from the time synchronization server device 103.

The time calculation unit 209 receives the estimated delay from the estimated delay calculation unit 208, and time information included in the response packet from the receive processing unit 205, and calculates a corrected time to correct the current time based on the estimated delay and time information.

The application execution unit 210 receives the corrected time which has been corrected to a reference time from the time setting unit 201, and executes an application using the corrected time.

Next, the operation of the measuring apparatus 200 according to the first embodiment is explained with reference to the flowchart in FIG. 3.

In step S301, the packet generation unit 202 generates a request packet, and the transmit processing unit 203 transmits the request packet via the network interface unit 204.

In step S302, the receive processing unit 205 receives a response packet from the time synchronization server device 103 via the network interface unit 204.

In step S303, the communication delay calculation unit 206 calculates a communication delay. A communication delay may be calculated using time information included in the request packet and response packet, for example. More specifically, as time information, time point t1 at which a request packet is transmitted, time point t2 at which the request packet is received at the time synchronization server device 103, and time point t3 at which a response packet is transmitted by the time synchronization server device 103 are recorded, and time point t4 at which the response packet is received at the receive processing unit 205 is obtained. The request packet includes time point t1 as time information, and the response packet includes time point t2 and time point t3 as time information. Hence, a communication delay is calculated by the expression (1) below, using time points t1, t2, t3, and t4.

$$\text{communication delay} = \frac{(t4 - t3) + (t2 - t1)}{2} \quad (1)$$

Note that time point t2 and time point t3 are not necessarily extracted from a response packet, and can be obtained from a different packet, or by a different notification method.

In step S304, the communication delay storage 207 stores the communication delay calculated at the step S303.

In step S305, the estimated delay calculation unit 208 calculates an estimated delay from communication delays stored in the communication delay storage 207. Herein, a communication delay with a minimum value is obtained as an estimated delay from communication delays including the most recently-calculated communication delay and the communication delay from N-times (N is a natural number) before. Note that an estimated delay can be obtained by adding a predetermined value to the minimum communication delay. A predetermined value can be a value that averages variations, for example, an average or median value of a difference between time point t4 and time point t3 for N-times in the past. By this, accuracy in estimating a communication delay can be improved.

In step S306, the time calculation unit 209 calculates a corrected time. The corrected time can be calculated based on time point t3 obtained from a newest response packet among received response packets and an estimated delay, using the expression (2) shown below:

$$\text{Corrected time} = t3 + \text{estimated delay} \quad (2)$$

Thus, the operation of the measuring apparatus according to the first embodiment is finished. Note that the process of obtaining an estimated delay at step S305 may be performed every time the measuring apparatus 200 receives a response packet, or not performed for a certain period of time and the same estimated delay may be used to calculate a corrected time.

To use a minimum value selected from samples of communication delays obtained by the process of calculating communication delay for N-times in the past is equivalent to the assumption that a communication delay of a request packet and a communication delay of a response packet are minimum, and has an effect of minimizing a difference between an actual communication delay in the samples and a result of the expression (1) on the assumption that a communication delay of a request packet and a communication delay of a response packet are equal. Also, in a network where variations of communication delays of response packets are small, and variations of communication delays of request packets are large, like a network premised in the present embodiment, a communication delay of a response packet is small and the variations are small. Thus, an estimated value which achieves high accuracy in every calculation of a current time of a response packet can be used.

According to the first embodiment described above, accuracy in estimating a communication delay can be improved by calculating an estimated delay using a minimum communication delay selected from samples in the calculation of a communication delay performed for N-times. Furthermore, an average of the difference between a transmission interval and an arrival interval of a response packet, or a median value, may be added to a current time. Thus, variations in a response packet can be reduced.

Second Embodiment

In the second embodiment, an expiry time is set for a calculated estimated delay, and it is determined whether or not an estimated delay should be calculated again. This is the difference of the second embodiment from the first embodiment. With the second embodiment, accuracy in estimating a communication delay can be improved even when a communication state, of the network changes.

The measuring apparatus according to the second embodiment is explained with reference to the block diagram in FIG. 4.

The measuring apparatus 400 according to the second embodiment includes a time setting unit 201, a packet generation unit 202, a transmit processing unit 203, a network interface unit 204, a receive processing unit 205, a communication delay calculation unit 206, the communication delay storage 207, the time calculation unit 209, the application execution unit 210, the estimated delay storage 401, an expiration determination unit 402, and an estimated delay calculation unit 403.

The time setting unit 201, the packet generation unit 202, the transmit processing unit 203, the network interface 204, the receive processing unit 205, the communication delay calculation unit 206, the communication delay storage 207, the time calculation unit 209, and the application execution unit 210 carry out the same operations as described in the first embodiment. So the explanations of the operations are omitted herein.

The estimated delay storage 401 receives an estimated delay from the estimated delay calculation unit 403, and stores the estimated delay.

The expiration determination unit 402 determines whether or not an expiry time of the estimated delay stored in the estimated delay storage 401 has expired. The determination is made by comparing the last time of calculating an estimated delay, which is stored in the estimated delay storage 401, with an expiry time. If the time when an estimated delay is calculated is later than the time set as an expiry time, it is determined that the time is expired. If the expiry time of the estimated delay is expired, an instruction signal to calculate an estimated delay again is generated. The expiry time may set by user's input, and may be set in advance.

The estimated delay calculation unit 403 performs the operation in almost the same manner as that of the estimated delay calculation unit 208 in the first embodiment; however, the process of calculating an estimated delay when an instruction signal is received from the expiration determination unit 402 is different from the operation of the estimated delay calculation unit 208.

Next, the operation of the measuring apparatus 400 is explained with reference to the flowchart in FIG. 5.

The explanation of the processing from step S301 through step S306 illustrated in FIG. 5 is omitted as the processing is the same as the processing from step S301 through step S306 illustrated in FIG. 3.

In step S501, the expiration determination unit 402 determines whether or not the expiry time of the estimated delay is expired. If expired, the process proceeds to step S303, and if not expired, the process proceeds to step S306.

In step S502, the estimated delay storage 401 stores the estimated delay obtained at step S305. At this step, the operation of the measuring apparatus 400 according to the second embodiment is finished. The process of transmitting a request packet at step S301 may be carried out when the expiry time of the estimated delay is expired.

According to the above-described second embodiment, a calculation load imposed on the measuring apparatus can be reduced, and the accuracy of the estimation of a communication delay can be improved by setting the expiry time of an estimated delay, even when a communication status of the network changes.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A measuring apparatus used in an asymmetrical network in which a first traffic in a network from a plurality of first devices to one or more second devices is larger than a second traffic in the network from the one or more second devices to the plurality of first devices, the one or more second devices being fewer than the first devices, the apparatus comprising:

a first calculation unit configured to calculate, as a communication delay for each request packet, a half of a round trip time based on first time information included in the request packet and second time information included in a response packet, the request packet requesting a notification of a reference time and being transmitted from one of the first devices, the response packet being a response to the request packet and being transmitted from one of the one or more second devices;

a second calculation unit configured to calculate one of one or more communication delays below a threshold among a plurality of communication delays as an estimated delay of each response packet, wherein the estimated delay is obtained by adding a predetermined value to a minimum communication delay among the one or more communication delays; and an expiration determination unit configured to determine whether or not an expiry time of the estimated delay is expired, wherein the second calculation unit calculates another estimated delay when the expiry time of the estimated delay is expired.

2. The apparatus according to claim 1, wherein the second calculation unit obtains the minimum communication delay as the estimated delay from a second plurality of communication delays that have been calculated up to the most recently-calculated communication delay since the calculation N-times before, N being a natural number.

3. The apparatus according to claim 1, wherein the second calculation unit obtains, as a new estimated delay, a time which is obtained by adding a first value to the estimated delay, the first value being a value for averaging variations of the plurality of communication delays.

4. The apparatus according to claim 1, wherein the response packet includes a reference time at a second device, the apparatus further comprising a third calculation unit configured to calculate a corrected time based on the estimated delay and the reference time, the corrected time being a time to correct a current time to a reference time.

5. The apparatus according to claim 1, wherein the first calculation unit determines a half of a time which is a sum of a first time period and a second time period as the communication delay, the first time period being a time period between a first time point at which a request packet is transmitted to a second device and a second time point at which the request packet is received by the second device, the second time period being a time period between a third time point at which the response packet is transmitted from the second device and a fourth time point at which the response packet is received.

6. A measuring method used in an asymmetrical network in which a first traffic in a network from a plurality of first devices to one or more second devices is larger than a second traffic in the network from the one or more second devices to the plurality of first devices, the one or more second devices being fewer than the first devices, the method comprising:

calculating, as a communication delay for each request packet, a half of a round trip time based on first time information included in the request packet and second time information included in a response packet, the request packet requesting a notification of a reference time and being transmitted from one of the first devices, the response packet being a response to the request packet and being transmitted from one of the one or more second devices;

calculating one of one or more communication delays below a threshold among a plurality of communication delays as an estimated delay of each response packet to be transmitted from the one or more second devices, wherein the estimated delay is obtained by adding a predetermined value to a minimum communication delay among the one or more communication delays; and determining whether or not the expiry time of the estimated delay is expired, wherein the second calculation unit calculates another estimated delay when the expiry time of the estimated delay is expired.

7. The method according to claim 6, wherein the calculating the one of one or more communication delays obtains the minimum communication delay as the estimated delay from a plurality of communication delays that have been calculated up to the most recently-calculated communication delay since the calculation N-times before, N being a natural number.

8. The method according to claim 6, wherein the calculating the one of one or more communication delays obtains, as a new estimated delay, a time which is obtained by adding a first value to the estimated delay, the first value being a value for averaging variations of the plurality of communication delays.

9. The methods according to claim 6, wherein the response packet includes a reference time at a second device, the method further comprising calculating a corrected time based on the estimated delay and the reference time of the second device, the corrected time being a time to correct a current time to a reference time.

10. The method according to claim 6, wherein the calculating the half of the round trip time determines a half of a time which is a sum of a first time period and a second time period as the communication delay, the first time period being a time period between a first time point at which a request packet is transmitted to a second device and a second time point at which the request packet is received by the second device, the second time period being a time period between a third time point at which the response packet is transmitted from the second device and a fourth time point at which the response packet is received.

* * * * *